Sept. 7, 1948.     T. A. O. GROSS     2,448,526
FREQUENCY DISCRIMINATING CIRCUITS
Filed April 10, 1946

INVENTOR
THOMAS A. O. GROSS
BY Elmer J. Gorn
ATTY.

Patented Sept. 7, 1948

2,448,526

UNITED STATES PATENT OFFICE 2,448,526

FREQUENCY DISCRIMINATING CIRCUITS

Thomas A. O. Gross, Boston, Mass., assignor to Raytheon Manufacturing Company, Newton, Mass., a corporation of Delaware Application April 10, 1946, Serial No. 660,888

7 Claims. (Cl. 250—27)

1

This invention relates to frequency discriminating circuits, and aims to provide apparatus of the general character indicated which, unlike conventional apparatus for similar purposes, does not make use of resonant circuits, and is especially adaptable to low-frequency applications, for example, the speed control of motor generators, etc.

In the accompanying specification there shall be described, and in the annexed drawing shown, an illustrative embodiment of the frequency-discriminating circuit of the present invention. It is, however, to be clearly understood that the present invention is not to be limited to the details herein shown and described for purposes of illustration only, inasmuch as changes therein may be made without the exercise of invention, and within the true spirit and scope of the claims hereto appended.

Figure 1:
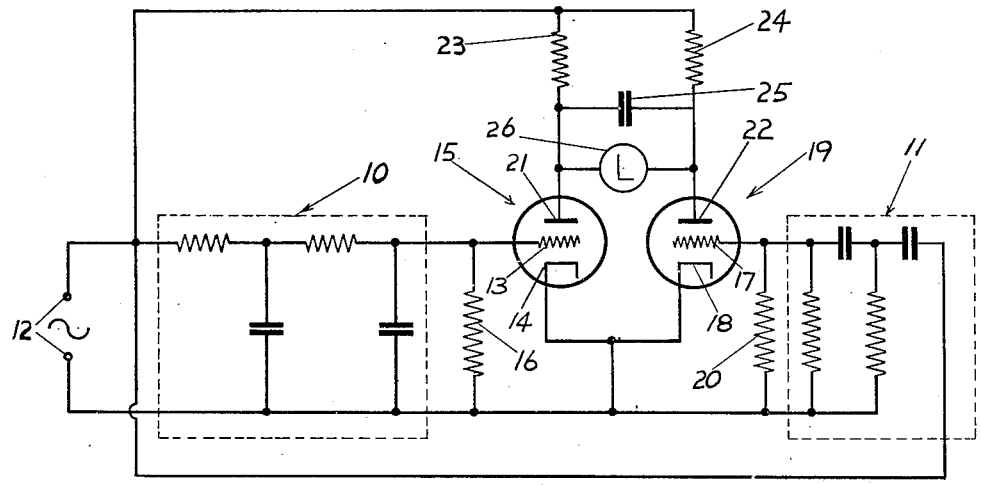
Figure 2:
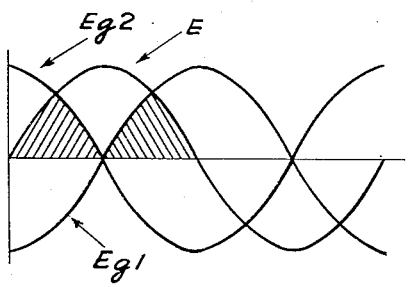
Figure 3:
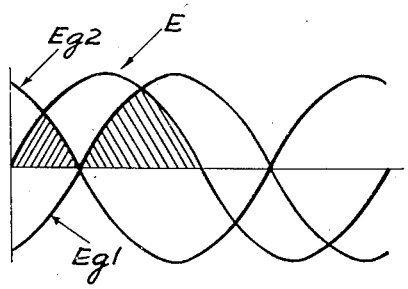

In said drawing,

Fig. 1 is a circuit diagram of a frequency discriminator assembled in accordance with the principles of the present invention; and Figs. 2 and 3 show voltage curves explaining the operation of the circuit of Fig. 1.

Referring now more in detail to the aforesaid illustrative embodiment of the present invention, with particular reference to Fig. 1 of the drawing, the numerals 10 and 11 designate two phase-shifting networks connected in parallel across a source 12 of alternating voltage of varying frequency. Said networks, which may comprise resistors and capacitors, or resistors and inductors, here shown as the former, are designed to derive from said source of alternating voltage two alternating-voltage portions which differ in phase, at a selected frequency, from the phase of said source, preferably by 90°, one leading and the other lagging. In the network 10 as here shown, if the ratio $R/X_c$ is large, the output voltage of said network will lag the input voltage, and in the network 11 as here shown, if said ratio is small, the output voltage of said last-named network will lead the input voltage.

The output voltage of the network 10 is applied between the control electrode 13 and the cathode 14 of an electron-discharge device 15, said control electrode being returned to said cathode through a resistor 16; and the output voltage of the network 11 is applied between the control electrode 17 and the cathode 18 of an electron-discharge device 19, said last-named control electrode being returned to said last-named cathode through a resistor 20.

The anodes 21 and 22 of the electron-discharge devices 15 and 19 are connected, respectively, through resistors 23 and 24, to one terminal of the source 12 of alternating voltage, and said anodes are connected to each other by an integrating capacitor 25 across which any load device 26 may be connected.

For an understanding of the operation of the above circuit, reference is made to Fig. 2 of the drawing. As there shown, E represents the alternating voltage at whose frequency the networks 10 and 11 produce alternating-voltage portions having phases which oppositely differ from that of the initial voltage by equal amounts, preferably by 90°. This voltage, in addition to its being applied in parallel to the phase-shifting networks 10 and 11, is also applied in parallel to the anodes of the electron-discharge devices 15 and 19.

$E_{g1}$ represents the lagging output of the phase-shifting network 10 which is applied to the electron-discharge device 15, and $E_{g2}$ represents the leading output of the phase-shifting network 11 which is applied to the electron-discharge device 19.

The shaded portion at the left represents the time during which the electron-discharge device 19 conducts, and the shaded portion at the right represents the time during which the electron-discharge device 15 conducts.

The average voltage across the integrating capacitor 25 and, therefore, across the load device 26, is proportional to the difference between the areas of the shaded portions above referred to. Where the phase shifts introduced by the networks 10 and 11 are equal and opposite, as they are at the selected frequency above referred to, the areas of said shaded portions are equal to each other, and the anode-to-anode voltage, or the voltage across the load device, is zero.

Where, however, the frequency of the source 12 decreases below the aforementioned selected frequency, the phase shifts introduced by the networks 10 and 11 no longer cause the voltages applied to the control electrodes of the electron-discharge devices to have phases which differ equally from the phase of the voltages applied to the anodes of said electron-discharge devices. In other words, the control electrode voltages will shift to the left, as shown in Fig. 3 of the drawing, and this causes the electron-discharge devices to conduct for unequal periods of time. Therefore, the integration of the outputs of said electron-discharge devices results in developing voltage across the capacitor 25 the magnitude of which is a function of the deviation of the frequency of the source 12 from the above referred to selected frequency.

If the frequency of said source 12 increases above said selected frequency, the sense of the voltage developed across the integrating capacitor 25 reverses.

This completes the description of the aforesaid illustrative embodiment of the present invention, including its mode of operation. It will be noted from all of the foregoing that a simple frequency discriminator has been devised which eliminates the necessity for resonant circuits.

Other objects and advantages of the present invention will readily occur to those skilled in the art to which the same relates.

What is claimed is:

1. A frequency discriminator comprising: means connected to a source of alternating voltage of varying frequency for deriving therefrom two alternating-voltage portions whose phases differ equally and oppositely from the phase of said source at a selected frequency; means also connected to said source of alternating voltage for deriving therefrom two additional alternating-voltage portions which are in phase with said source; and means receptive of said out-of-phase and in-phase alternating-voltage portions for deriving therefrom a unidirectional output whose amplitude and sense are functions, respectively, of the magnitude and sense of any deviation of the frequency of said alternating voltage from said selected frequency.

2. A frequency discriminator comprising: means connected to a source of alternating voltage of varying frequency for deriving therefrom two alternating-voltage portions whose phases differ equally and oppositely from the phase of said source at a selected frequency; means also connected to said source of alternating voltage for deriving therefrom two additional alternating-voltage portions which are in phase with said source; a pair of electron-discharge devices receptive of said out-of-phase and in-phase alternating-voltage portions for deriving therefrom two unidirectional outputs the amplitude and sense of the difference between which are functions, respectively, of the magnitude and sense of any deviation of the frequency of said alternating voltage from said selected frequency; means for integrating said unidirectional outputs in opposition to each other; and a load circuit connected across said last-named means.

3. A frequency discriminator comprising: means connected to a source of alternating voltage of varying frequency for deriving therefrom two alternating-voltage portions whose phases differ equally and oppositely from the phase of said source at a selected frequency; means also connected to said source of alternating voltage for deriving therefrom two additional alternating-voltage portions which are in phase with said source; a pair of electron-discharge devices each of which includes a cathode, an anode and a control electrode; the control electrode and the cathode of one of said electron-discharge devices being receptive therebetween of one of said first-named alternating-voltage portions, the control electrode and the cathode of the other of said electron-discharge devices being receptive therebetween of the other of said first-named alternating voltage portions, the anode and cathode of one of said electron-discharge devices being receptive therebetween of one of said second-named alternating-voltage portions, and the anode and cathode of the other of said electron-discharge devices being receptive therebetween of the other of said second-named alternating-voltage portions; means connected between the anodes of said electron-discharge devices for integrating the outputs thereof; and a load device connected across said last-named means.

4. A frequency discriminator comprising: a pair of phase-shifting networks, connected in parallel across a source of alternating voltage of varying frequency for deriving therefrom two alternating-voltage portions whose phases differ equally and oppositely from the phase of said source at a selected frequency; means also connected to said source of alternating voltage for deriving therefrom two additional alternating-voltage portions which are in phase with said source; a pair of electron-discharge devices receptive of said out-of-phase and in-phase alternating-voltage portions for deriving therefrom two unidirectional outputs the amplitude and sense of the difference between which are functions, respectively, of the magnitude and sense of any deviation of the frequency of said alternating voltage from said selected frequency; means for integrating said unidirectional outputs in opposition to each other; and a load circuit connected across said last-named means.

5. A frequency discriminator comprising a pair of phase-shifting networks, connected in parallel across a source of alternating voltage of varying frequency for deriving therefrom two alternating-voltage portions whose phases differ equally and oppositely from the phase of said source at a selected frequency; means also connected to said source of alternating voltage for deriving therefrom two additional alternating-voltage portions which are in phase with said source; a pair of electron-discharge devices each of which includes a cathode, an anode and a control electrode; the control electrode and the cathode of one of said electron-discharge devices being receptive therebetween of one of said first-named alternating-voltage portions, the control electrode and the cathode of the other of said electron-discharge devices being receptive therebetween of the other of said first-named alternating voltage portions, the anode and cathode of one of said electron-discharge devices being receptive therebetween of one of said second-named alternating-voltage portions, and the anode and cathode of the other of said electron-discharge devices being receptive therebetween of the other of said second-named alternating-voltage portions; means connected between the anodes of said electron-discharge devices for integrating the outputs thereof; and a load device connected across said last-named means.

6. In combination with a source of alternating voltage of varying frequency: means for deriving from said voltage two alternating-voltage portions which, at a selected frequency, oppositely differ in phase from the phase of the initial voltage by like amounts; a pair of electron-discharge devices each of which includes a cathode, an anode and a control electrode; the control electrode and the cathode of one of said electron-discharge devices being receptive therebetween of one of said alternating-voltage portions, the control electrode and the cathode of the other of said electron-discharge devices being receptive therebetween of the other of said alternating-voltage portions, and the anodes and the cathodes of both of said electron-discharge devices being connected in parallel across said initial alternating voltage; means for integrating the anode outputs of both of said electron-discharge devices; and a load device connected across said last-named means.

7. In combination with a source of alternating voltage of varying frequency: means for deriving from said voltage two alternating-voltage portions which, at a selected frequency, oppositely differ in phase from the phase of the initial voltage by like amounts; a pair of electron-discharge devices each of which includes a cathode, an anode and a control electrode; the control electrode and the cathode of one of said electron-discharge devices being receptive therebetween of one of said alternating-voltage portions, the control electrode and the cathode of the other of said electron-discharge devices being receptive therebetween of the other of said alternating-voltage portions, and the anodes and the cathodes of both of said electron-discharge devices being connected in parallel across said initial alternating voltage; a capacitor connected between the anodes of both of said electron-discharge devices for integrating the anode outputs of both of said electron-discharge devices; and a load device connected across said last-named means.

THOMAS A. O. GROSS.